United States Patent [19]

Kazama et al.

[11] 3,742,975

[45] July 3, 1973

[54] SPRING BIASED BALL VALVE WITH ROTATING DEVICE

[75] Inventors: Toshio Kazama; Kazunori Seki, both of Nagaoka, Japan

[73] Assignee: Tamagawa Kikai Kinzoku Kabushiki Kaisha, Tokyo-to, Japan

[22] Filed: June 23, 1972

[21] Appl. No.: 265,674

Related U.S. Application Data

[63] Continuation-in-part of Ser. No. 83,071, Oct. 22, 1970, abandoned.

[30] Foreign Application Priority Data

July 13, 1970 Japan.................................. 45/61265

[52] U.S. Cl............................... 137/331, 137/539.5
[51] Int. Cl............................................. F16k 15/04
[58] Field of Search.................... 137/330, 331, 539, 137/539.5; 417/98

[56] References Cited
UNITED STATES PATENTS
1,674,113  6/1928  Houston........................ 137/539.5 X
2,103,673  12/1937  Hoferer.......................... 137/539.5
2,415,258  2/1947  Parker et al...................... 137/539.5
2,714,392  8/1955  Mercier....................... 137/539.5 X
3,241,496  3/1966  Imai et al............................. 417/98
3,437,082  4/1969  Bouwkamp et al............. 137/330 X Primary Examiner—William R. Cline
Attorney—Robert E. Burns et al.

[57] ABSTRACT

A ball-valve mechanism comprising essentially a hollow ball valve of a specific gravity of from 2.5 to 4, a valve seat, and a valve guide is further provided with an automatic ball-valve rotating device comprising a valve-pressing member, a spring continually pressing the valve-pressing member against the valve and thereby urging the valve toward the valve seat, and an appreciable clearance between the valve and the valve guide, the surface of the valve-pressing member thus contacting the valve being inclined, that is, not being perpendicular to the axial centerline of the valve seat but being at an angle of from 8° to 24° relative to a plane perpendicular to the axial centerline of the valve seat, and the degree of unbalance of the ball valve being less than 3.6 percent.

7 Claims, 4 Drawing Figures

SPRING BIASED BALL VALVE WITH ROTATING DEVICE

CROSS-REFERENCE TO RELATED APPLICATION

This is a continuation-in-part application of Patent Application Ser. No. 83,071, filed Oct. 22, 1970, now abandoned, and entitled: AUTOMATIC BALL-VALVE ROTATING DEVICE.

BACKGROUND OF THE INVENTION

This invention relates generally to spherical or ball valves and more particularly to a new and advanced ball-valve mechanism including a device for automatically rotating a ball valve thereby to assure that all parts of the entire spherical surface of the valve successively and uniformly contact the valve seat.

In general, ball valves are frequently used as suction valves of pumps of reciprocating type, for example a slurry pump, and have the following principal advantages over other types of valves.

1. Since the entire outer surface of a ball valve has a uniform sealing effect, if all parts of the entire valve surface come successively into contact with the valve seat, local wear of specific parts will not occur, whereby the serviceable life of the valve will be extremely long.

2. Since the valve is of spherical shape, there is little possibility of solid particles of foreign matter being jammed or ground into the gaps between the valve and the valve-seat contact surface or the valve guide. Moreover, even if such particles are jammed into these gaps, they are easily dislodged. Therefore, instances of malfunctioning are rare, and the valve operation is stable.

Accordingly, ball valves are highly effective for use as valves in slurry pumps and like apparatus.

In most cases in actual practice, however, a ball valve does not rotate well, and only a certain particular part thereof chronically contacts the valve seat, whereby the valve undergoes rapid wear at this part and becomes defective in a short time. Particularly in the case of rubber ball valves with internal cores or hollow steel ball valves, it is difficult in the fabrication process thereof to obtain spheres which are mechanically balanced, and almost all of such valves are used in unbalanced state. Consequently, the sides of the balls toward which their centers of gravity are offset contact the valve seats, whereby the above mentioned localized wear phenomenon occurs.

SUMMARY OF THE INVENTION

It is an object of the present invention to prevent shortening of the serviceable lives of ball valves due to the above described uneven and localized wear.

More specifically, an object of the invention is to provide a ball-valve mechanism including an automatic ball valve rotating device whereby, particularly each time the valve lifts off its seat, it is rotated by a small angle, and all parts of its entire surface contact the valve seat in a uniform manner irrespective of a somewhat unbalanced state of the ball valve.

According to this invention, breifly summarized, there is provided a ball-valve mechanism comprising: a ball valve; a valve seat to receive the ball valve in coaxial alignment on a common axis to close a valve port; a valve guide for guiding the ball valve and limiting its movements when it is apart from the valve seat, a relatively large clearance being provided between the valve and the valve guide; a valve-pressing member having a contact surface for contacting the ball valve; and a spring continually pressing the valve-pressing member toward the ball valve and thereby causing the contact surface to press against the ball valve to urge the same toward the valve seat, the contact surface of the valve-pressing member being inclined by an angle of the order of from 8° to 24° relative to a plane perpendicular to the above mentioned common axis, the specific gravity of the ball valve being of the order of from 2.5 to 4.0, and the center of gravity of the ball valve being at a distance not greater than 3.6 percent of the diameter of the ball valve from the geometric true center of the ball diameter.

The nature, principle, and utility of the invention will be more clearly apparent from the following detailed description with respect to a preferred embodiment of the invention when read in conjunction with the accompanying drawing, in which like parts are designated by like reference numerals and characters.

DETAILED DESCRIPTION

Figure 1:
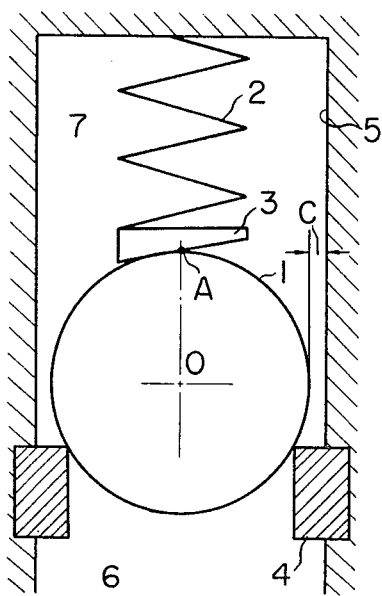
FIGS. 1 through 4 are diagrammatic side views, each in a section along a plane passing through the centers of a ball valve and of its valve seat, showing an example of an automatic ball valve rotating device according to the invention in various operative states relative to the ball valve and seat, FIG. 1 showing the valve closed state, FIG. 2 showing the state wherein the valve has been lifted, and a fluid is passing thereby, FIG. 3 showing the valve beginning to close after passage of the fluid, and FIG. 4 showing the valve again in fully closed state.

Referring to FIG. 1, there is diagrammatically shown a ball valve mechanism, which may be used as a ball-valve mechanism of a slurry pump such as shown and disclosed in U.S. Pat. No. 3,241,496, patented Mar. 22, 1966, and which comprises essentially a ball valve 1, a valve seat 4, and a valve guide 5, an upper chamber 7 and a lower chamber 6 being formed respectively above and below the valve seat 4. A feature of the invention is that a clearance C is provided between the valve guide 5 and the ball valve 1 in fully closed state.

In this example of the invention, a valve-pressing plate 3 is urged toward and pressed against the ball valve 1 by a compression spring 2 with a line of force passing approximately through the center of the valve in fully closed state. The surface of the valve-pressing plate 3 in contact with the valve 1 is inclined, that is, is not perpendicular to the line of force of the spring 2 and to the axial centerline of the valve seat 4. Another feature of this invention is that this contact surface is at an angle of from 8° to 24° relative to the horizontal plane. We have found that this is a requisite angle range. If this angle is less than 8°, the torque applied to the ball valve will be insufficient, and the ball valve will not rotate. If the angle is greater than 24°, the valve will not rotate as a valve of a pump but will slip along the inclined surface.

In general, when the pressure in lower chamber 6 becomes higher than the pressure in upper chamber 7, ball valve 1 rises, overcoming the force of spring 2, and the fluid flows from lower chamber 6 into upper chambr 7 to be conducted to a desired place. When the pressure in lower chamber 6 becomes lower than that in upper chamber 7, ball valve 1 is pressed by the force of spring 2, and partly by the force due to the pressure difference, against valve seat 4, whereby reverse flow of the fluid is prevented. This check-valve action is well known.

Figure 2:
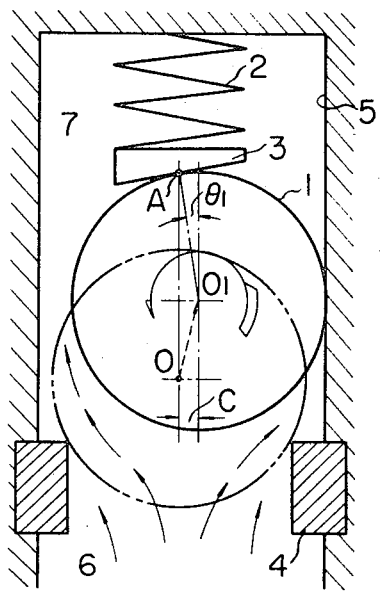

In the ball-valve mechanism provided with the valve-rotating device according to the invention and the clearance C between the valve and the valve guide 5, ball valve 1 rises counter to the force of spring 2 when the pressure in lower chamber 6 becomes higher than that in upper chamber 7 as described above. Additionally, hwever, the inclination of the surface of plate 3 in contact with the valve causes the valve to be pressed transversely against valve guide 5 as indicated in FIG. 2, the center of ball valve 1 being thereby shifted from 0 to $0_1$.

As a result, ball valve 1 during this action undergoes a rotational motion which is very nearly a rotation in the arrow direction through an angle $\Theta_1$ corresponding the the clearance C about point A as a center of rotation. Point A is the point in space where the axial centerline of the valve seat 4 passes through the surface of the fully closed ball valve 1 at the part thereof most remote from the valve seat.

Figure 3:
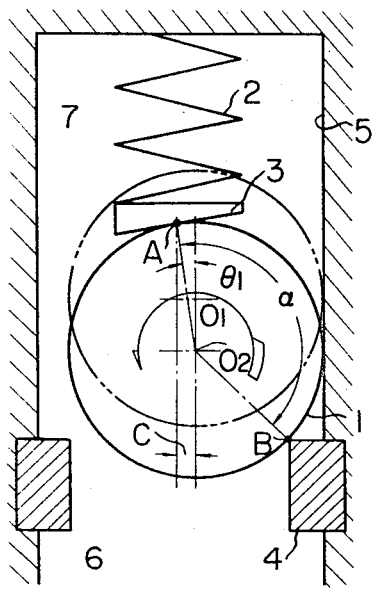
Figure 4:
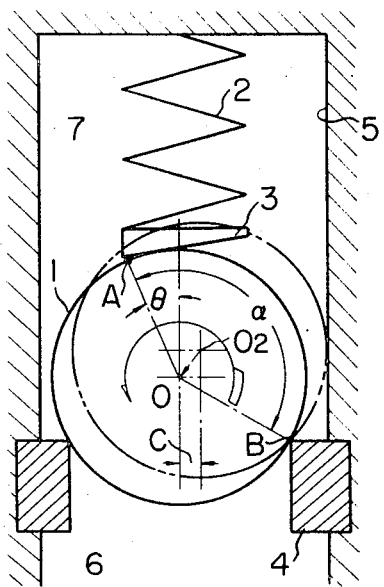

Then, when the pressure in lower chamber 6 becomes lower than that in upper chamber 7, ball valve 1 descends as indicated in FIG. 3 until it contacts valve seat 4 at point B, the center of valve 1 thereby being shifted from $0_1$ to $0_2$. Ball valve 1 then rotates in the arrow direction shown in FIG. 4 about point B as a pivotal center until it is fully seated in valve seat 4.

Thus, one cycle of the operation of the ball-valve mechanism and valve-rotating device is completed. During this one cycle, ball valve 1 undergoes a rotation of 473, which is repeated each time the valve is lifted, whereby the uneven and localised contacting of the valve is effectively prevented, and whereby the serviceable life of the valve is substantially prolonged. Moreover, this ball valve rotation is accomplished by a device of simple and trouble-free construction which does not add appreciably to the manufacturing cost of the valve mechanism.

We have found through extensive experiments that, in order to achieve the above described operation of the ball-valve mechanism, including the valve rotating device, the specific gravity of the ball valve must be in the range of from 2.5 to 4.0. If the specific gravity is grater than 4, the inertia of the valve will be large and interfere with the uniform rotation of the valve; while if it is less than 2.5, the valve will rotate but will undergo irregular motion due to occurrences such as bouncing and thereby give rise to other operational defects.

In order to obtain a ball valve of a specific gravity within the above stated range, it must be made hollow or of composite construction with a core part of relatively low density material in the case of most materials suitable for the exterior surface. In almost all cases, the most practical construction is a hollow construction.

Ideally, a hollow ball valve is finished to have a uniform wall thickness, but such a structure is rarely attained in practice. In almost cases, irregularities occur in the fabrication process, such as casting of a hollow metal ball valve, whereby "unbalance" thereof occurs. That is, the center of gravity of the finished ball valve is not coincident with the geometric true center of the ball valve. Obviously, an excessively unbalanced ball valve cannot be used.

We have found that slightly unbalanced ball valves can be practically used, and that the limit to this unbalance ($v$) is 3.6 percent as calculated by the equation $v = (b/a) \times 100$, where $b$ is the distance of the center of gravity of the ball valve from its geometric true center, and $a$ is the diameter of the ball valve. We have found that it becomes difficult for a ball valve of an unbalance exceeding 3.6 percent to rotate.

In order to indicate still more clearly the nature and utility of this invention, the following examples of practice illustrating specific embodiments of the invention and results of experiments are set forth. It should be understood, of course, that these examples and results are presented as illustrative only and are not intended to limit the scope of the invention.

These experiments and examples are representative of those carried out to determine the conditions relating to the rotation of ball valves during operation.

In one series of experiments, specimen ball valves were coated over their entire outer surfaces with a lacquer, and then each specimen was subjected to a repeated operation test as a part of a ball-valve mechanism according to the invention with a specific angle of inclination of the contact surface of the valve-pressing member 3, and the time for the lacquer to crack and peel off each ball valve was measured.

In another series of tests, specimen ball valves were operated continuously for long periods in a slurry, and the uniformity of the wear of each ball valve was examined.

Example 1

Ball-valve specimens were prepared by coating the entire exterior surface of hollow steel spheres each of an outer diameter of 100 mm. and a specific gravity of 3.16 with a lacquer. These valves specimens were subjected to repeated operation tests respectively with angles of inclination of the valve-pressing member 3 of 5° and 8°.

As a result, it was found that in the case of an inclination of 5°, the lacquer peeled off completely in 30 minutes, whereas, with an inclination of 8°, the lacquer peeled off completely after 8 minutes. This indicates that with an inclination angle of 8°, the automatic rotation of the ball valve occurs smoothly.

Example 2

Similarly as in Example 1, ball-valve specimens were prepared with hollow steel spheres each of an outer diameter of 150 mm. and a specific gravity of 2.70 and were respectively tested with inclination angles of 12° amd 20°.

As a result, in all cases the lacquer coating peeled off completely after 5 minutes. Accordingly, it can be said that, under the conditions set forth, the ball valves underwent smooth automatic rotation.

Example 3

Similarly as in Example 1, ball-valve specimens were prepared with hollow steel spheres each of an outer diameter of 200 mm., and a specific gravity of 2.99 and were respectively tested with inclination angles of 24° and 30°.

As a result, complete peeling off of the lacquer coating occurred after 10 minutes with the inclination angle of 24° and after 20 minutes with the inclination angle of 30°. This result indicates that, with an inclination angle of the contact surface of the valve-pressing member 3 exceeding 24°, the automatic rotation of the ball valve does not occur smoothly.

Example 4

Ball-valve specimens were prepared with hollow steel spheres of the same outer diameter of 100 mm. but with respectively different wall thickness and, thereof, different specific gravities of 2.0, 2.5, 3.16, 4.0, and 4.3. The ball-valve specimens were subjected to a repeated operation test similarly as in Example 1 except that an inclination angle of 12° was used in for all specimens.

As a result, the times for complete peeling off of the lacquer coating were 10 and 30 minutes for specific gravities of 2.0 and 4.3 and 5 minutes for specific gravities of 2.5, 3.16, and 4.0. From this result, it can be concluded that with specific gravites in the range of from 2.5 to 4.0, the automatic rotation of the ball valves is smooth.

Example 5

The procedure of Example 4 was followed except that the outer diameter of the ball valves were 150 mm.

As a result, the times for complete peeling off of the lacquer coating were 10 and 30 minutes for specific gravities of 2.0 and 4.3, respectively, and 5 minutes for specific gravites of 2.5, 3.16, and 4.0. From this result, also, it can be concluded that with specific gravities in the range of from 2.5 to 4.0, the automatic rotation of the ball valves is smooth. This result is the same as that in the preceding Example 4.

From the above examples and results, it can be concluded that with a ball-valve specific gravity in the range of from 2.5 to 4.0 and a inclination of the lower surface of the valve-pressing member 3 in the range of from 8° to 24°, smooth automatic rotation of the ball valve can be attained, and all parts of the spherical surface of the ball valve contact the valve seat in a uniform, averaging manner. Accordingly, concentrated local wear is prevented, and the ball-valve mechanism can withstand a long period of operational use.

We have been carrying out long-period, continuous tests on specimens of the ball-valve mechanism according to this invention over periods of from 1 to 2 years with respect to slag and bauxite slurries. So far, no concentrated, localized wear of the ball valve surfaces, whatsoever, has been observed.

The results of the above example and results are summarized in Tables 1 and 2.

TABLE 1

| Hollow steel ball (diam.) (spec. grav.) | Inclination angle (°) | Time required for complete peeling off of lacquer coating (min.) | | | | | | | |
|---|---|---|---|---|---|---|---|---|---|
| | | 3 | 5 | 8 | 10 | 15 | 20 | 30 | 60 | 90 |
| 100 mm | 5 | | | | | | | | | |
| 3.16 | 8 | | | | | | | | | |
| 150 mm | 12 | | | | | | | | | |

TABLE 1 —Continued

| Hollow steel ball (diam.) (spec. grav.) | Inclination angle (°) | Time required for complete peeling off of lacquer coating (min.) | | | | | | | |
|---|---|---|---|---|---|---|---|---|---|
| | | 3 | 5 | 8 | 10 | 15 | 20 | 30 | 60 | 90 |
| 2.70 | 20 | | | | | | | | | |
| 200 mm | 24 | | | | | | | | | |
| 2.99 | 30 | | | | | | | | | |

TABLE 2

| Hollow steel ball (spec. grav.) | Time required for complete peeling off of lacquer coating (min.) | | | | | | | |
|---|---|---|---|---|---|---|---|---|
| | 3 | 5 | 8 | 10 | 15 | 20 | 30 | 60 | 90 |
| 2.0 | | | | | | | | | |
| 2.5 | | | | | | | | | |
| 3.16 | | | | | | | | | |
| 3.5 | | | | | | | | | |
| 4.0 | | | | | | | | | |
| 4.5 | | | | | | | | | |

Note: Since ball valves of specific gravities less than 2.0 are impractical, tests thereon were omitted.

We claim:
1. A ball-valve mechanism comprising:
a ball valve of a specific gravity of the order of from 2.5 to 4.0;
a valve seat adapted to receive said ball valve in coaxial alignment on a common axis to close a valve port;
a valve guide for guiding the ball valve and limiting its movements when the valve is apart from said valve seat, a relatively large clearance being provided between the valve and said valve guide;
a valve-pressing member having a contact surface for contacting the ball valve; and
a spring continually pressing said valve-pressing member toward the ball valve and thereby causing said contact surface to press against the ball valve to urge the same toward the valve seat, said contact surface being inclined by an angle of the order of from 8° to 24° relative to a plane perpendicular to said axis.
2. A ball-valve mechanism according to claim 1 in which said ball valve is of hollow construction.
3. A ball-valve mechanism according to claim 2 in which the center of gravity of said ball valve is at a distance not greater than 3.6 percent of the ball-valve diameter from the geometric true center of the ball valve.
4. A ball-valve mechanism according to claim 3 which is adapted to operate with a slurry-like fluid as a working medium.
5. A ball-valve mechanism according to claim 4 which is used in a slurry pump.
6. A ball-valve mechanism according to claim 4 in which the ball valve, at least in the outer surface part thereof, is made of a metal.
7. A ball-valve mechanism according to claim 1 in which the center of gravity of said ball valve is at a distance not greater than 3.6 percent of the ball-valve diameter from the geometric true center of the ball valve.

* * * * *